United States Patent [19]

Ehrne et al.

[11] Patent Number: 5,790,278
[45] Date of Patent: Aug. 4, 1998

[54] SCANNER WITH DRAWER LOAD AND EXIT

[75] Inventors: Franklin D. Ehrne, Rochester; Eric P. Hochreiter, Bergen; Dale W. Ryan, Rochester; Martin L. Slade, Spencerport, all of N.Y.

[73] Assignee: Eastman Kodak Company, Rochester, N.Y.

[21] Appl. No.: 618,697

[22] Filed: Mar. 20, 1996

[51] Int. Cl.⁶ .................. H04N 1/04; G03G 15/00; G03B 27/62

[52] U.S. Cl. .......... 358/496; 358/474; 399/377; 399/380; 355/75; D14/116; D18/46

[58] Field of Search .............. 358/400, 401, 358/474, 496, 497, 498, 909.1; 399/377, 378, 379, 380, 213; D14/114, 116, 118, 123; D18/46; 364/708.1, 709.1; 355/75; 250/234, 235, 236, 239, 208.1

[56] References Cited

U.S. PATENT DOCUMENTS

| | | | |
|---|---|---|---|
| 4,707,113 | 11/1987 | Shinbrot et al. | 399/377 |
| 5,166,812 | 11/1992 | Dow et al. | 358/498 |
| 5,191,406 | 3/1993 | Brandestini et al. | 358/22 |
| 5,270,841 | 12/1993 | Watanabe | 358/496 |
| 5,333,066 | 7/1994 | Sugata | 358/474 |
| 5,463,256 | 10/1995 | Wang et al. | 271/274 |
| 5,499,108 | 3/1996 | Cotte et al. | 358/498 |
| 5,612,794 | 3/1997 | Brandestini et al. | 358/505 |
| 5,663,812 | 5/1995 | Pan | 358/474 |
| 5,663,813 | 9/1997 | Pan | 358/474 |

*Primary Examiner*—Edward L. Coles
*Assistant Examiner*—Kimberly A. Williams
*Attorney, Agent, or Firm*—David M. Woods

[57] ABSTRACT

A scanner includes a drawer, extendible outside the scanner, for loading the original into the scanner; and a drawer supporting arrangement for supporting the drawer for movement into and out of the scanner while scanning takes place during at least part of the movement. The scanner can either be a desktop unit coupled to a host computer or mounted in a drive bay of a computer, in which case the drawer is extendible outside the drive bay for loading the original into the scanner.

2 Claims, 9 Drawing Sheets

SCANNER WITH DRAWER LOAD AND EXIT

FIELD OF THE INVENTION

The invention relates generally to the field of input scanning for a computer, and in particular to the field of photographic print or color document scanning, especially in the sizes typically returned to customers when they process their film, such as five inches by seven inches and smaller.

BACKGROUND OF THE INVENTION

In order to allow consumers to be able to easily use their photographic images, or other types of images, in computer documents, there is a need to provide customers with easy access to the equipment that is necessary to digitize these images. Typical consumers take photographic images with film loaded into a camera. They will process the film at a photo finisher and receive processed negatives and photographic prints in return. The negatives are very apt to being lost or misplaced, but the prints are usually stored where they can be accessed in the future, such as in an album or a shoebox. The photographic print sizes that typical customers receive are usually five inches by seven inches and smaller, down to a wallet size of one and a half inch by two and a quarter inch.

Currently there exists several types of scanners that allow consumers to digitize their photographic images, or other type of documents, into their computer applications. Each have their drawbacks. Flat bed scanners are bulky, expensive, and best suited for higher quality applications. Hand-held scanners are available, but suffer from poor scan control. Large and small format sheet-fed scanners are also available, but they are limited in the type and condition of media they can accept without potential damage to the medium. Moreover, these scanners take up additional space on the desktop and for most home applications space is usually at a minimum.

With regard to the problem of space utilization, U.S. Pat. No. 5,191,406 describes a transparency scanner housed in a chassis having the same dimensions as a standard half-height 5¼" floppy disk drive. Thus the scanner can be mounted in a standard disk drive bay of a conventional personal computer. Each transparency is hand inserted into an opening on the input bezel of the scanner. A slide tray inside the scanner grips the transparency and transports the transparency past a scanning beam. While this scanner fits comfortably into an existing computer peripheral space, certain drawbacks remain. As mentioned earlier, transparencies, i.e., slides and negatives, are less likely to be the type of originals that a consumer has to work with. Moreover, the scanner is limited to originals meeting certain rigid size specifications. In addition, the original is gripped by machine driven components and therefore subject to damage. Furthermore, the internal slide tray that positions the original for scanning must meet exacting tolerances for scanning. This leads to additional costs.

The need therefore remains for a simple reflection scanner that minimizes expensive components while still allowing a variety of different sized originals to be scanned.

SUMMARY OF THE INVENTION

The aforementioned need is realized according to the invention by a scanner including a drawer, extendible outside the scanner, for loading the original into the scanner; and a drawer supporting arrangement for supporting the drawer for movement into and out of the scanner while scanning takes place during at least part of the movement. The scanner can either be a desktop device coupled to a host computer or a device mounted in a drive bay of the computer, in which case the drawer is extendible outside the drive bay for loading the original into the scanner.

The scanner according to this invention has many advantages over the prior technology. The drawer leads to a small size that allows the scanning device to be conveniently located inside a computer. This is convenient for a consumer because it will use less desk space than if the scanner was a separate unit. However, the scanner can be configured as a desk top device that will have, along with the bay-mounted configuration, additional advantages over the existing technology. The drawer and its clear cover lid allows the print to be protected from any object touching or potentially damaging the print. The clear window or cover lid will also help to flatten any curled prints while they are in the process of being scanned.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because electronic scanning devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
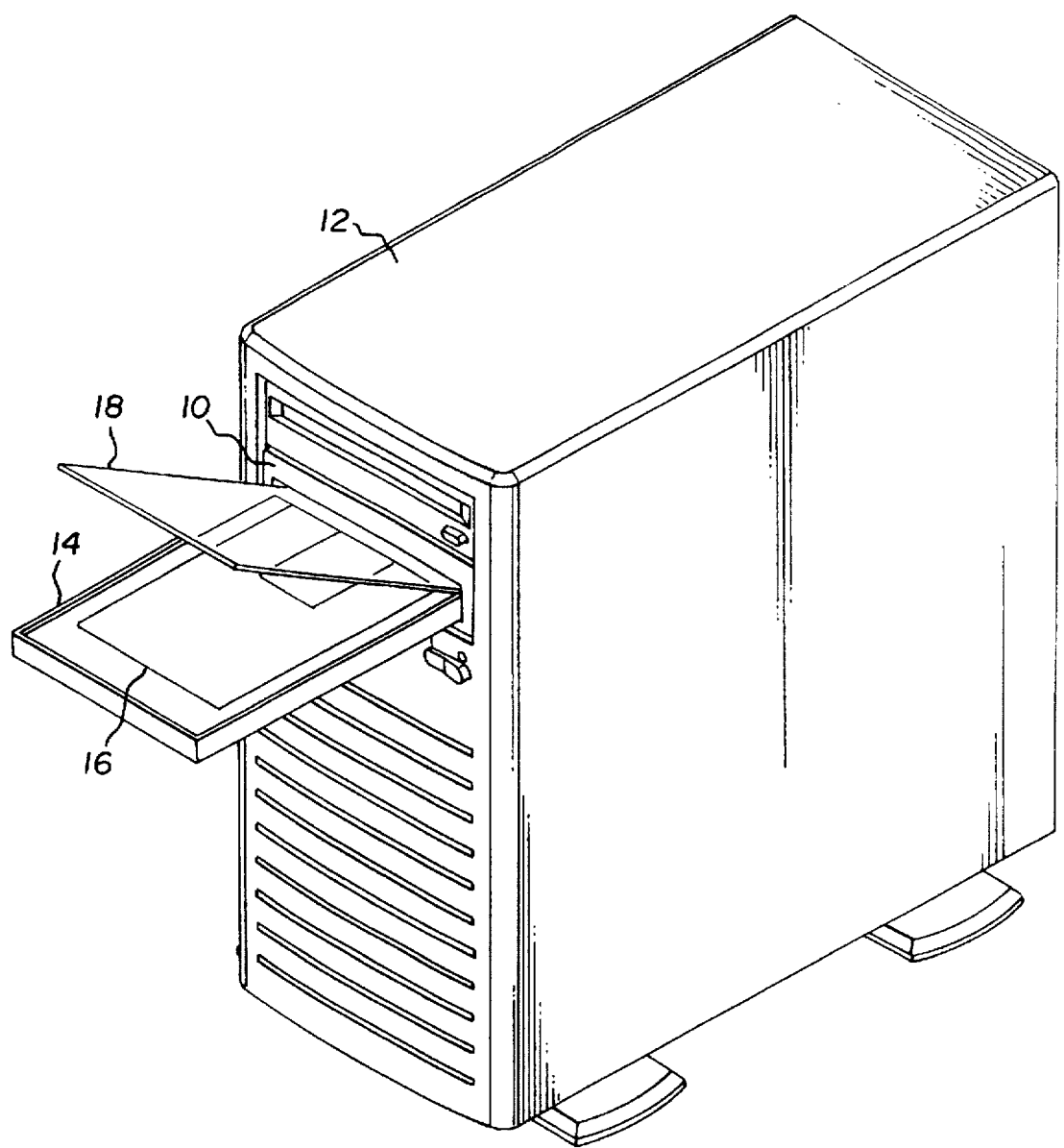
FIG. 1 is a perspective view of a scanner mounted in a drive bay of a computer showing an extendible drawer and its raised lid according to the invention.

The preferred embodiment of a scanner according to the invention comes in two versions: one for mounting in a drive bay of a computer and the other as a desk top unit. Both operate in conjunction with a host processor. Referring first to FIG. 1, a scanner 10 is shown mounted into a conventional half height, drive bay 12 of the type used with a desktop computer or workstation (not shown). The scanner 10 includes an extendible drawer 14, which is used for loading and positioning an original 16 prior to scanning. As will be shown and described, the drawer 14 is also used to accurately guide the original 14 through an image scanning location in the scanner 10. The drawer 14 may be manually released and/or closed or its movement may be automated through a command from the host computer.

A clear lid 18 is manually lifted as shown or mechanically raised by conventional means about a pivot 19 (shown in FIG. 3) when the drawer 14 is extended from the bay 12. The lid 18 is of sufficient optical quality to allow scanning through the lid material. The lid 18 also serves to flatten any original material that may have curl, besides functioning as a protective device for the original 16 and helping to prevent external debris from contaminating the internal components of the scanner 10. The clear window of the lid 18 will be approximately the same size as the largest print accepted into the drawer 14. A particular advantage of the drawer-lid arrangement is that, if there are any defects on the lid window, the defect will appear on the scanned image as a spot relatively equal to the proportion of the size of the spot compared to the original. If the scan window only covered a smaller area within close proximity to the scan area, such as the way most hand held and sheet fed scanners are currently configured, the defect would appear as a line across the entire scanned image and would be much more objectionable to the consumer.

Figure 2:
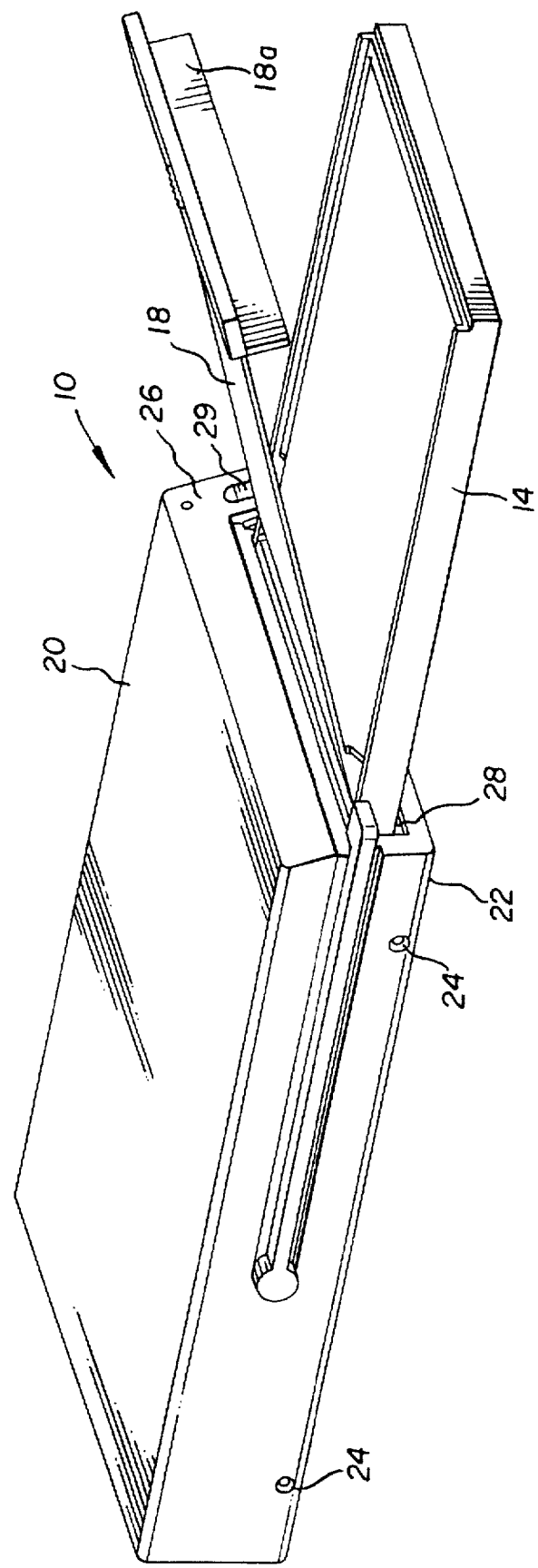
FIG. 2 is a perspective view of a desk top version of the scanner shown in FIG. 1.

In FIG. 2, the scanner 10 is shown in its desk-top version including an upper casing 20 fastened into a lower casing 22 (also shown in FIG. 8) at fastener locations 24. The upper casing 20 includes a front bezel 26 and an opening slot 28 for the drawer 14. The lid 18 further includes a handle 18a, which forms part of the ornamental appearance of the front bezel 26 when the drawer 14 is fully inserted into the scanner 10. For either version, scanning is initiated from the host computer.

Figure 3:
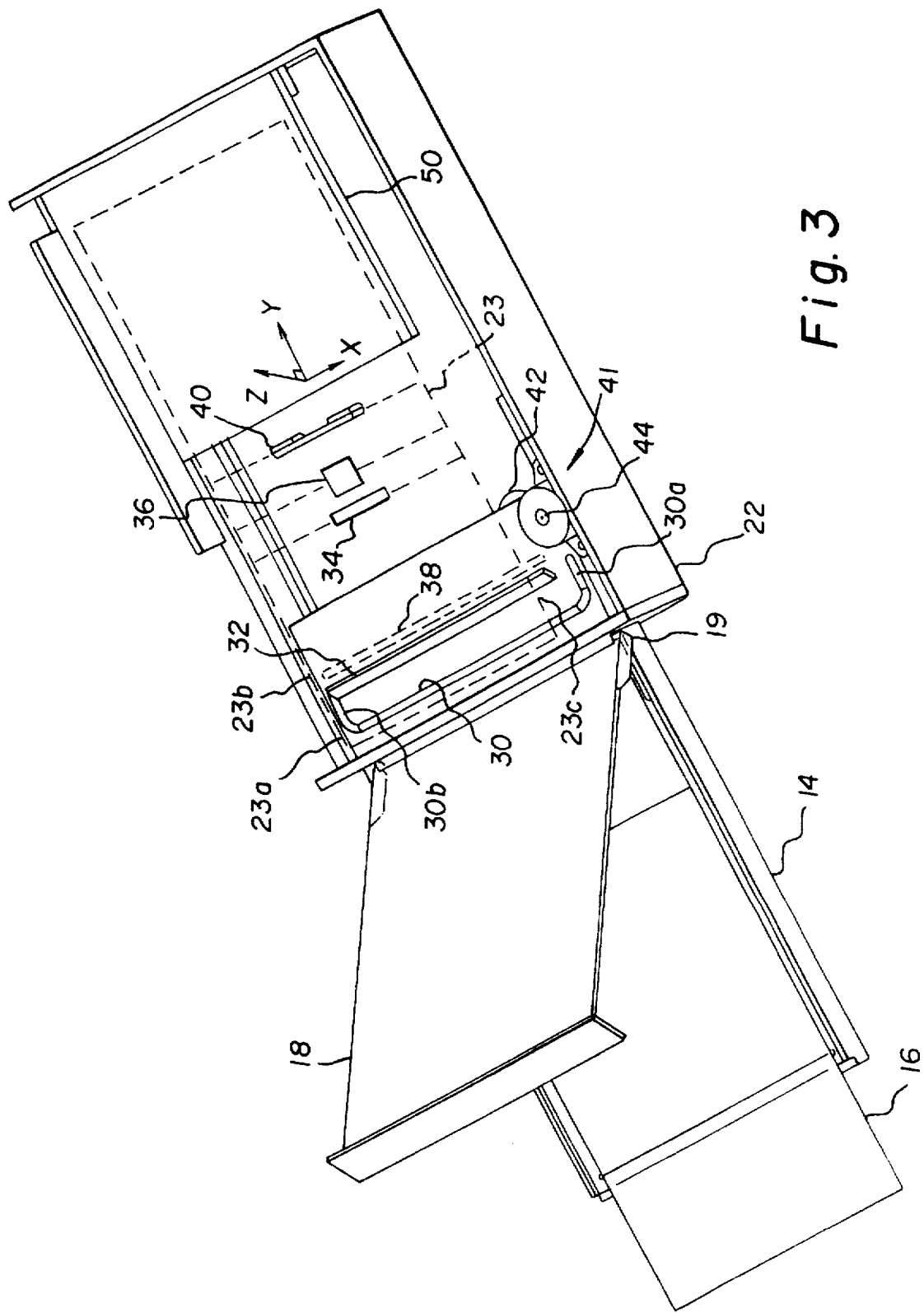
FIG. 3 is a perspective view of the baymounted scanner shown in FIG. 1 with the drawer partially extended from the scanner.
Figure 4:
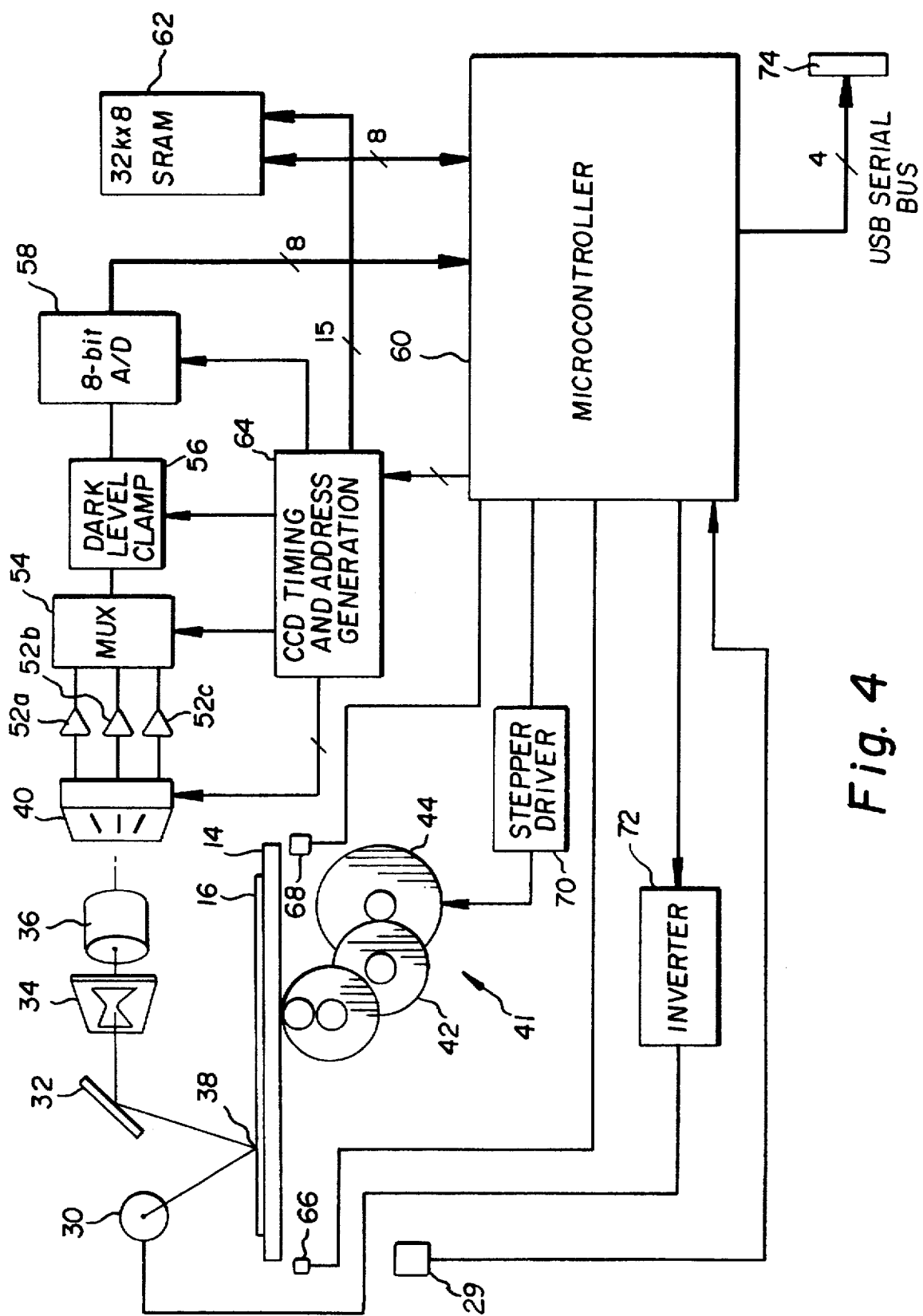
FIG. 4 is a block diagram showing the scanning system and associated electronics.
Figure 5:
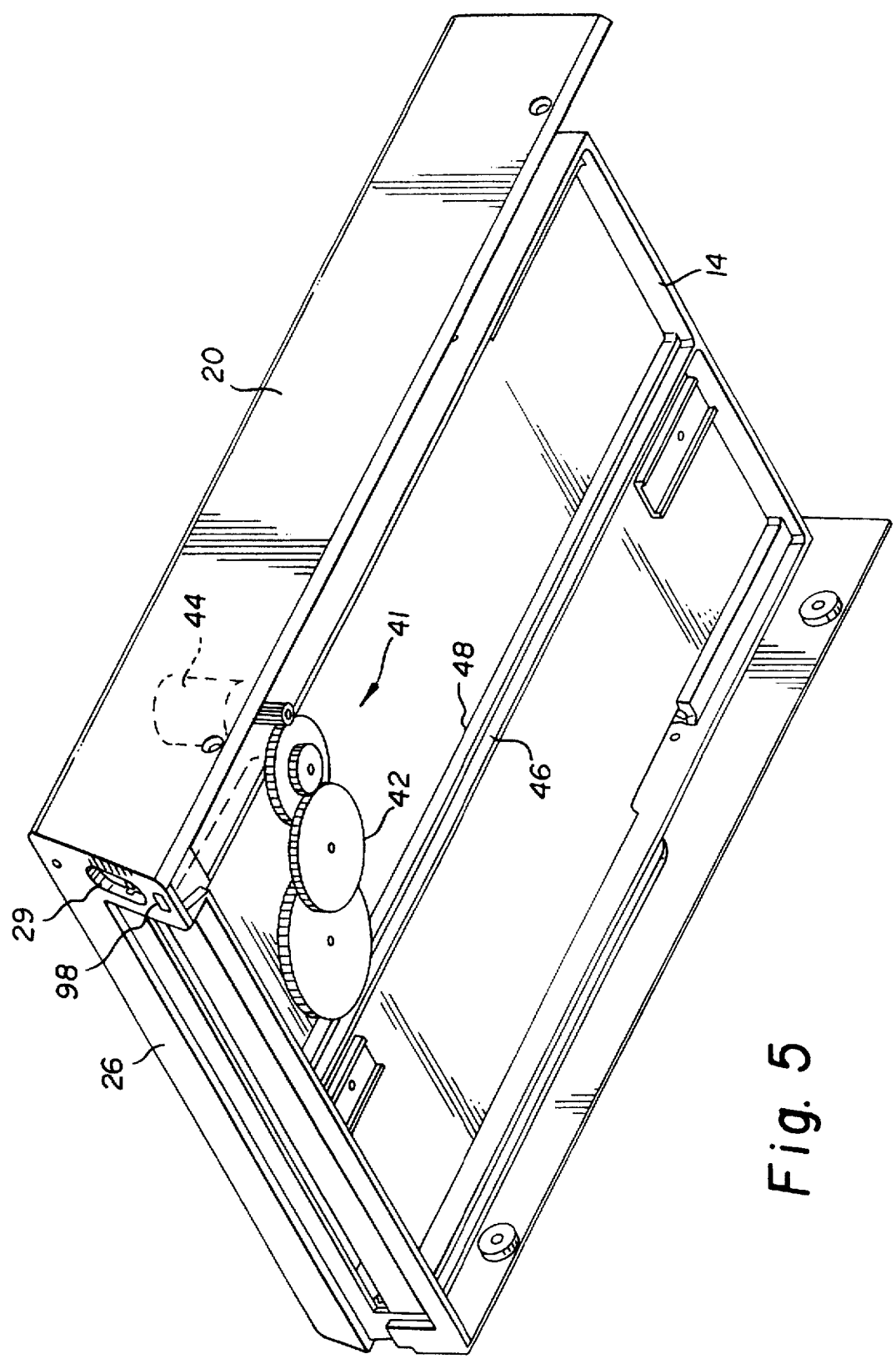
FIG. 5 is a perspective view of the scanner shown in FIG. 2 with the lower casing removed and the drawer fully inserted into the scanner to show the drive mechanism for the scanner.

The components of the scanning mechanism used in the scanner 10 are the same in both versions. In FIG. 3 the scanner 10 exposes the components from the top. In FIG. 5, the view is taken from the bottom of the upper casing to mainly show the drive mechanism. FIG. 4 shows the same internal components in relation to a block diagram of the signal processing and control system. Referring first to FIG. 3, the scanning mechanism includes a set of optical components including a lamp 30, a mirror 32, an aperture 34, a lens 36 and an imaging device 40. These optical components are mounted on an optical frame component 23, which is shown in broken lines to indicate that it may take different configurations depending on the shape, size, and location of the optical components. The optical frame component 23 is attached to the lower casing 22, on which a scanning drive mechanism 41 is mounted. The lamp 30, which is shown as a cold cathode fluorescent lamp with corner extensions 30a and 30b, provides even illumination of a linear image scan location 38 extending across the face of the original 16. As shown in FIG. 4, the best illumination position of the lamp is arranged at 45° with respect to the image scan location 38 so that an image scanning beam reflected from the original 16 is directed by the mirror 32 through the aperture 34 and the lens 36 upon the imaging device 40. The aperture 34 has a "bow-tie" opening that corrects for light falloff toward the edges of the image scanning beam. The imaging device is a tri-linear array charge-coupled device (CCD), with one array for each of red, green, and blue (RGB) colors.

The original 16 is positioned on the drawer 14 beneath the lid 18 with respect to reference marks (not shown). A button 29 (shown in FIG. 5) on the front bezel 26 activates the scanning drive mechanism 41 to open and close the drawer 14 (the drive mechanism 41 can also be actuated from the host computer). Once the drawer 14 has been closed with the original 16 in position under the lid 18, the scanning sequence is activated from the host computer. The scanning drive mechanism 41 includes a gear train 42 interconnecting a stepper motor 44 and a linear rack gear 46 formed on the bottom surface of a center rib 48 on the underside of the drawer 14. Scanning occurs as the drawer 14 is driven out of the scanner 10 by engagement of the gear train 42 and the rack 48. The stepper motor 44 is regulated to provide the required scan speed as the drawer 14 transports the original 16 past the illuminated image scan location 38 toward the front end of the scanner. During the scanning stage, the drawer 14 moves outward from the front of the scanner 10, and, if the scanner 10 is bay-mounted, outward from the drive bay 12.

The signal processing and control elements shown in FIG. 4 are mounted on a data processing board 50 (shown in FIG. 3) mounted to the optical frame component 23. The tri-linear array image sensor 40 produces a scanning signal comprising separate R,G,B analog output signals corresponding to red, green, and blue linear scans of the original. These signals are applied in tandem to three emitter follower buffers 52a,b,c and then combined into a single signal path by a multiplexer 54. The multiplexed signal is clamped in a dark level clamp 56 and converted into a digital signal by an A/D converter 58. The digital image signal is applied to a microcontroller block 60 and stored in a buffer memory 62. A CCD timing and address generator 64 controls the generation of drive signals for the imaging device 40 and the timing of the subsequent signal processing chain.

The position of the drawer 14 is monitored by a drawer open sensor 66 and a drawer closed sensor 68, both connected to the microcontroller block 60. The operator enabled button 29 applies a signal to the microcontroller block 60 that initiates a drive sequence, either extending the drawer 14 from the scanner 10 if the drawer is initially closed or drawing the drawer 14 into the scanner 10 if the drawer is initially open. When a scanning sequence is to commence, the microcontroller block 60 instructs a stepper driver 70 to enable the stepper motor 44, thereby driving the drawer 14 out of the scanner 10 past the image scan location. Meanwhile the microcontroller block 60 couples a power inverter 72 to the lamp 30, which illuminates the image scan location 38. After the scanning has begun, the microcontroller block 60 transfers the digital scanning signal to the host computer through a communication interface 74, in this case a USB serial bus. The microcontroller block 60 also receives instructions, such as to initiate a scan, from the host computer through the communication interface 74. Although not shown in FIG. 4, power is also supplied from the host computer.

Figure 6:
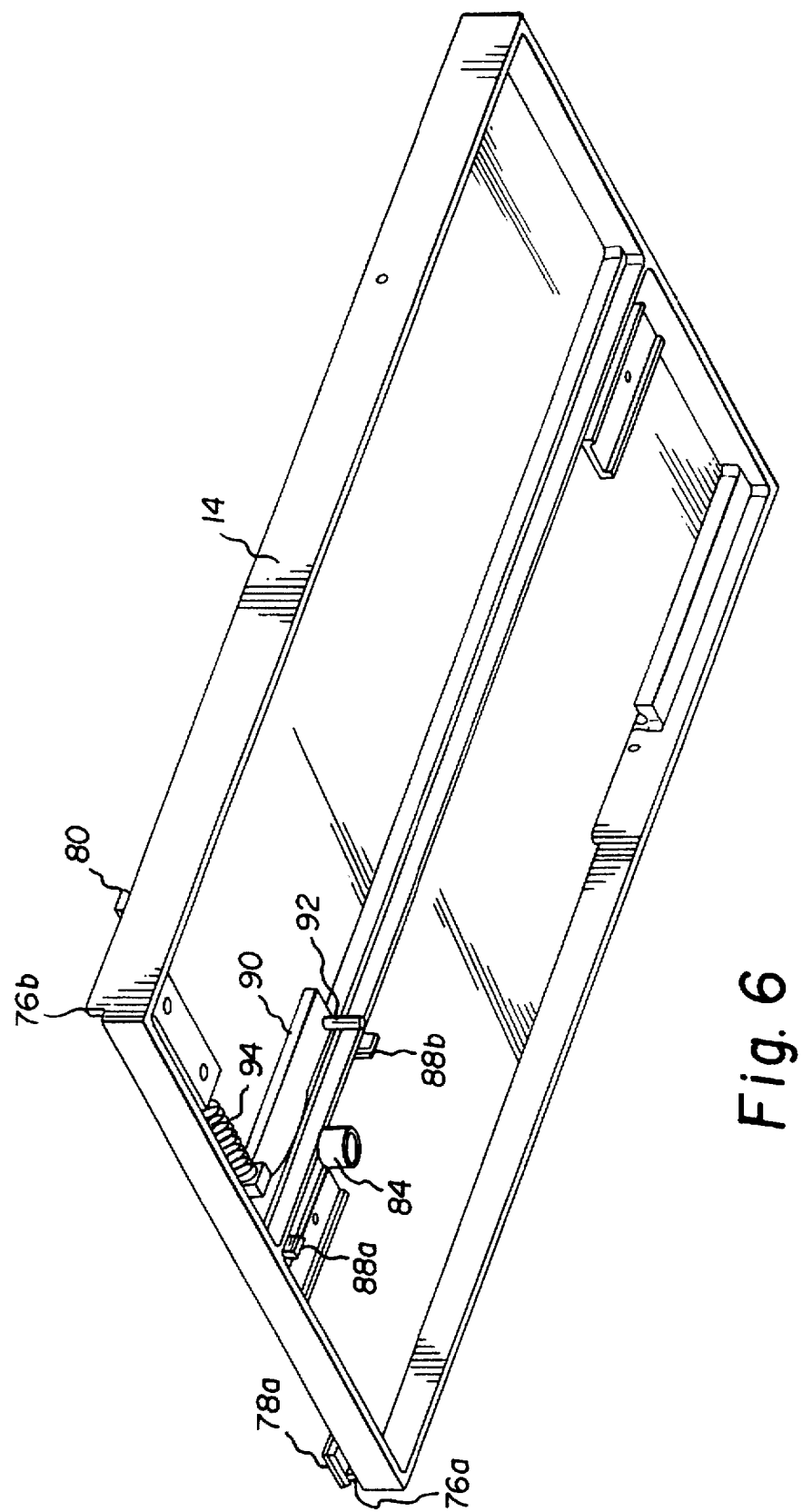
FIG. 6 is a perspective view of the drawer from underneath showing elements of the arrangement for supporting the drawer.
Figure 7:
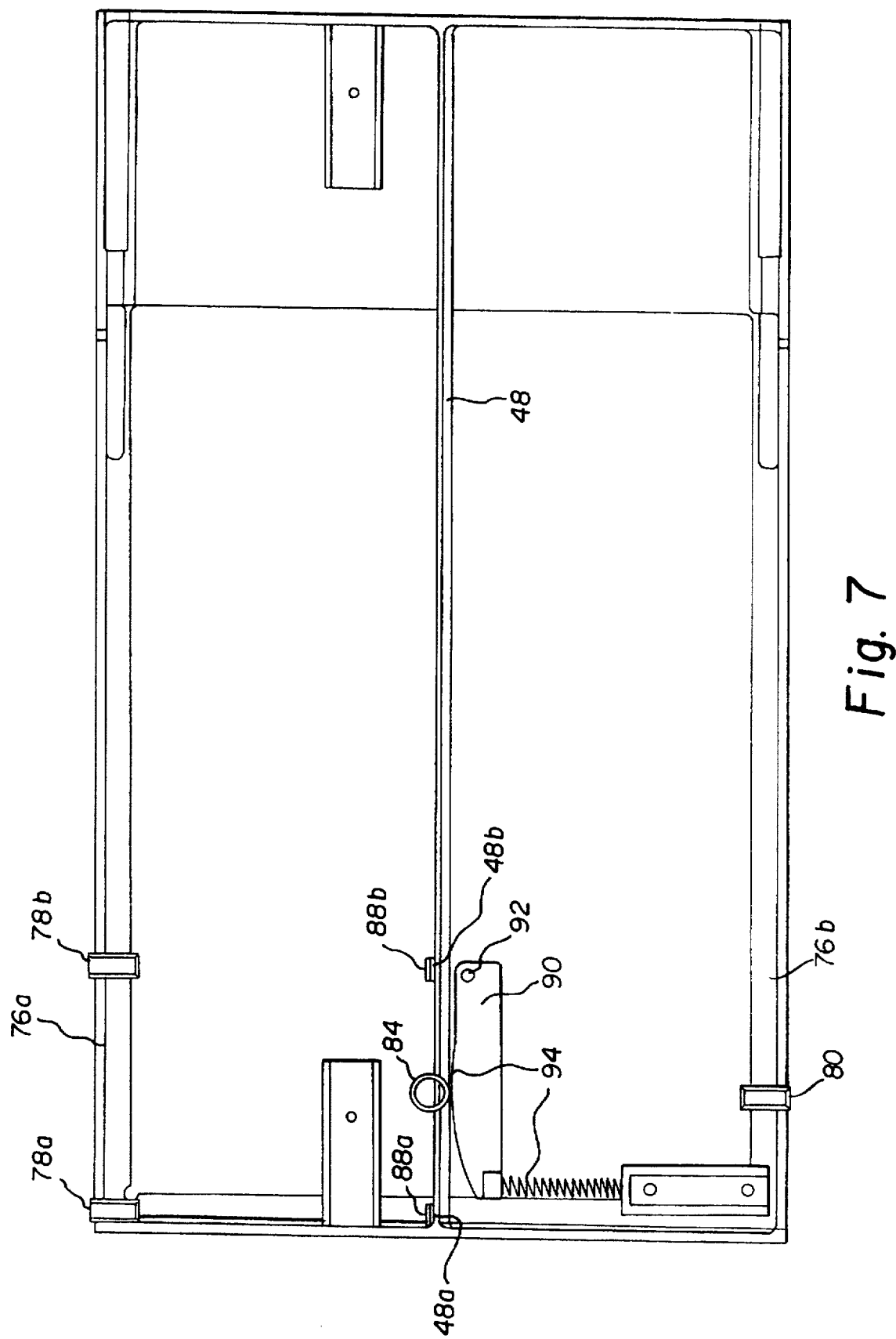
FIG. 7 is a plan view of the supporting arrangement for the drawer taken from the underside of FIG. 6.
Figure 8:
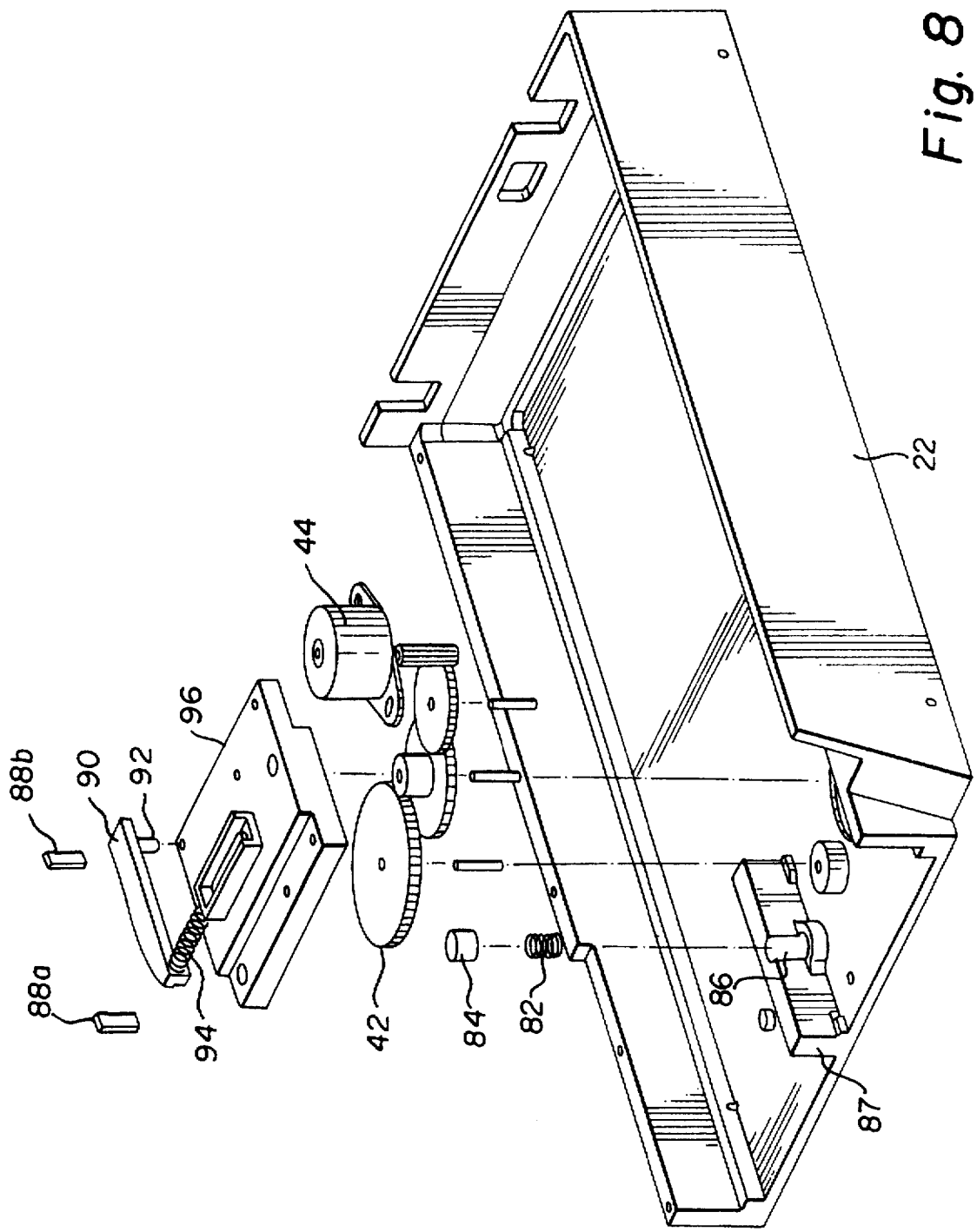
FIG. 8 is an exploded view of the lower casing of the scanner showing the supporting elements of FIGS. 6 and 7 and the gear train from FIG. 5.

FIGS. 6, 7, and 8 show elements of the drawer constraint, which is important in ensuring that the motion of the drawer can be held to the high tolerances necessary for precision scanning. In particular, the drawer 14 must be constrained against unwanted movement, linear or rotational, with respect to the X, Z, theta X, theta Y and theta Z coordinates shown in FIG. 3. The Y coordinate is not constrained, as this is the motion of the drawer opening and closing, as well as scanning. FIG. 6 shows the positions of the constraining elements in relation to the drawer, particularly from its underside, while FIG. 7 shows the same elements in plan view. FIG. 8 shows how some of the constraining elements are fastened into the lower casing 22 (the others being fastened into the optical frame component 23).

Three datum surfaces are located, generally at points 23a, b, and c on the underside of the optical frame component 23 that mounts the imaging device 40, lens 36, mirror 32, the lamp 30, and the data processing board 50, as viewed in FIG. 3. These datum surfaces are the locating features for the drawer 14 in the Z, theta X, and theta Y directions according to FIG. 3. The drawer 14 is loaded against the three datum surfaces by a load that is applied to the bottom of the center rib 48, and which is centrally located on the drawer between the three datum surfaces. This load needs to be high enough to support the drawer 14 against all three datum surfaces throughout the full travel of the drawer in both directions. The loading of the drawer against these three datum surfaces constrains the drawer in the Z direction, and prevents rotation about the X and Y axis, as shown in FIG. 3.

With regard to the preferred embodiment, as shown in FIG. 6, the drawer 14 is supported and constrained at the drawer's upper edges 76a and 76b and about the center rib 48 allowing it to be easily driven out of the drive bay 12 in the scan direction. The three aforementioned datum surfaces include two left drawer support pads 78a,b and a right drawer support pad 80, which are arranged in the upper casing 20 so that they form contacting surfaces for the upper edges 76a and 76b, respectively. The drawer 14 is loaded from the bottom of the center rib 48 by a spring 82 located in the hollow of a plunger 84 that fits into a pocket 86 in a housing 87 in the lower casing 22. This causes the loading of the drawer 14 against the drawer support pads 78a,b and 80 on either side of the drawer 14 so as to constrain the drawer in the Z direction and to prevent rotation about the theta X and Y axes.

Two datum surfaces are located on the lower housing 22 that mounts the optical frame component 23, the motor 44, and the gear train 42, as viewed in FIG. 3. These datum surfaces are generally located at points 48a and 48b as shown in FIG. 7, and the locating features for the drawer 14, in the X and theta Z directions according to FIG. 3. The drawer 14 is loaded against the two datum surfaces by a load that is applied to the opposite side of the center rib 48 on the drawer 14. The load is centrally located between the two datum surfaces, and must be high enough to always support the drawer against both datum surfaces throughout the full travel of the drawer in both directions. The loading of the drawer against these two datum surfaces constrains the drawer in the X direction and prevents rotation about the Z axis.

Referring again to the preferred embodiment as shown in FIG. 6, the drawer 14 is constrained in the X direction and against theta Z rotation by loading one side of the center rib 48 against a pair of rib support pads 88a,b, which provide the aforementioned two datum surfaces that are supported on the lower casing 22. This central loading is provided by a rocker 90 pivoted around a post 92 by a spring 94 against the center rib 48. The spring 94 and the post 92 are anchored in a gear cover 96, which mounts the gear train 42 and the motor 44 against the lower casing 22. The stepper motor 44 provides sufficient torque to overcome the loads applied to the drawer 14 and to drive the drawer 14 in the Y direction, which is not otherwise constrained.

The drawer is thus free to move in only one orientation that is also the scan direction or the Y direction, as shown in FIG. 3. The objective of this arrangement is to gain maximum drawer extension with minimal support so that the overall length of the drawer is kept at a minimum. The advantage of this supporting arrangement is that there are no additional components that will contact the drawer during the scanning process, such as multiple drawer slides that are widely used to gain maximum opening of drawers. Loading the drawer sideways at the center rib 48 instead of at one of the sides of the drawer allows the drawer to be easily pushed in manually from a location anywhere along the front of the drawer. If the loading was at the side of the drawer, and the drawer was being manually closed from the opposite front corner, the drawer would easily bind because of the angle through which the force was applied to the friction areas.

Because the operator can hand insert an original into the drawer 14 under the lid 18, and there is no further contact between the original and the scanner, the preferred embodiment eliminates any potential for damage to the original. In addition, the scanner (shown in FIG. 5) provides manual access at any time, if necessary via a mechanical drawer release, such as a recessed gear release 98 that can be operated by a tool or pin that would, e.g., release the drawer 14 from the gear train 42 such that the drawer is free to move. There is no direct contact with the original other than the clear lid 18 at any point in the scanning sequence. In one variation of the preferred embodiment, longer length originals can also be scanned by having a larger scanner enclosure that extends forward of the drive bay 12 to a predetermined position. In another variation, longer lengths can also be scanned by moving the optical frame assembly supporting the optical scanning components at the same time the drawer is moving but in the opposite direction, so that the drawer will now extend half of what it would if the optical frame did not move at all. In this type of variation, extensions in the rear of the bay enclosure can provide support for the additional original length that would accumulate during the scanning sequence.

Figure 9:
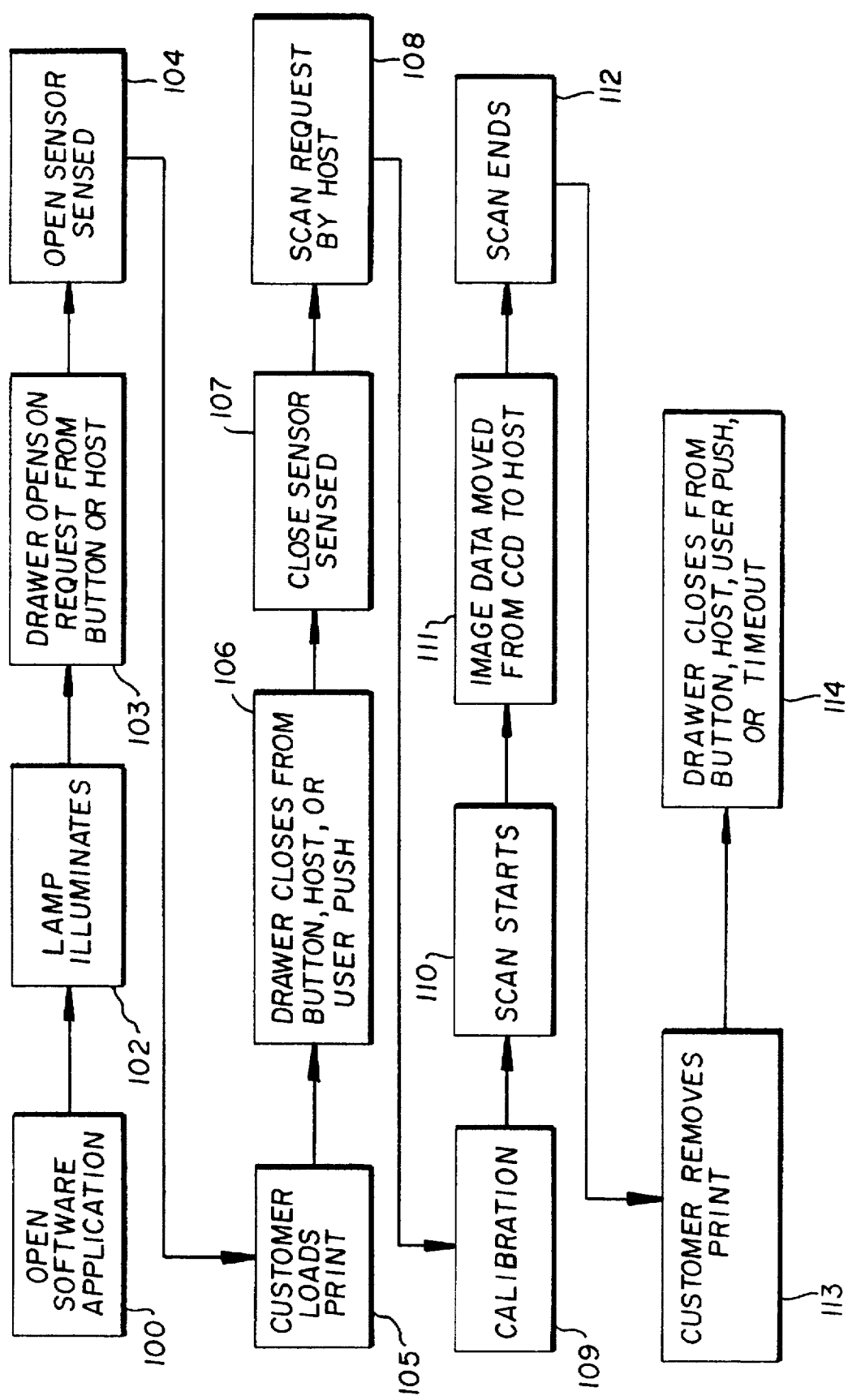
FIG. 9 is a process flow diagram showing the operation of the scanner according to the invention.

The operating process of the scanner is shown in the flow diagram of FIG. 9. The software application is opened on the host computer at step 100. At this time (step 102), the lamp 30 is illuminated. In step 103, the drawer 14 opens either on request from the host computer, through the software application, or by actuation of the button 29 on the front bezel 26. The drive mechanism 41 then drives the drawer open until the drawer open sensor 66 signals the microcontroller block 60 that the drawer is open (step 104). At step 105, the customer loads an original, e.g., a photographic print, onto the drawer 14 under the lid 18. The drawer 14 is then closed (step 106) by either actuating the button 29, entering an instruction through the host computer, or (after releasing the drive mechanism) by manually pushing the drawer into the scanner. The drawer closed sensor 68 senses closure (step 107), and the scanning sequence is initiated from the host computer (step 108).

Initially, a calibration step 109 may be completed by, e.g., the scanning of a white strip (not shown) on the front of the drawer 14. After calibration, the scanning sequence is commenced by controllably moving the drawer out of the scanner (step 110) and image data is moved from the imaging device 40 through the signal processing chain to the host computer (step 111). After the scan ends (step 112) the drawer 14 is fully extended and the customer lifts the lid 18 to remove the original (step 113). The drawer 14 is then retracted into the scanner, either by actuation of the button 29, by instruction from the host computer, by a user push, or by timeout after a predetermined time (step 114).

In summary, this invention involves locating a reflective media scanning device inside a desktop or tower type, computer configuration such that it takes up the same amount of space as a typical CD-ROM drive in a half height bay. The scanning device can also be mounted into a decorative enclosure and operated as a stand-alone, desk top device connected to the computer. The scanning device will be able to accept reflective media of a variety of sizes, e.g., from one and a half inches up to five inches wide and up to a length of seven inches, in a drawer with a clear cover that will protect the reflective media. The scanning device includes stages for transporting the prints into and out of the unit, for illuminating the prints, for projecting the subject matter of each print to an image sensing device, and for digitizing the data to be able to transfer the image to an application on the host computer.

The invention has been described with reference to a preferred embodiment. However, it will be appreciated that variations and modifications can be effected by a person of ordinary skill in the art without departing from the scope of the invention. For example, instead of occurring when the drawer 14 is opened, scanning can occur when the drawer 14 is drawn into the scanner 10. Furthermore, the drawer could be configured such that the bottom of the drawer 14 has a transparent area, and the original would be placed face down under the lid, whereby scanning would be performed from the bottom of the drawer. In this case, the drawer may need to be driven and supported from the side. This allows the image plane, which faces downward through the transparent drawer, to remain at the same location no matter how thick the original media might be. When the clear window cover is located above the drawer, the thickness of the original will be limited to the optical system depth of focus.

PARTS LIST
10 scanner
12 drive bay
14 drawer
16 original
18 lid
18a handle
19 pivot
20 upper casing
22 lower casing
23 optical frame component
24 fastener locations
26 front bezel
28 opening slot
29 button
30 lamp
30a,b corner extensions
32 mirror
34 aperture
36 lens
38 image scan location
40 imaging device
41 scanning drive mechanism
42 gear train
44 stepper motor
46 linear rack
48 center rib
50 data processing board
52a,b,c emitter follower buffers
54 multiplexer
56 dark level clamp
58 A/D converter
60 microcontroller block
62 memory
64 CCD timing and address generator
66 drawer open sensor
68 drawer closed sensor
70 stepper driver
72 power inverter
74 communication interface
76a,b upper edges
78a,b left drawer support pads
80 right drawer support pad
82 spring
84 plunger
86 pocket
87 housing
88a,b rib support pads
90 rocker
92 post
94 spring
96 gear cover
98 gear release

We claim:

1. A method for using a scanner to scan an original and generate a scanning signal, said method comprising the steps of:

extending a drawer outward from the scanner;

placing the original on the drawer in a position to be scanned;

moving the drawer into the scanner;

performing a calibration scan as the drawer is moved into the scanner;

sensing the closure of the drawer into the scanner;

actuating a scanning mechanism, in response to the sensing step, to illuminate an image scan location within the scanner; and moving the drawer out of the scanner past the image scan location while scanning the original to generate the scanning signal.

2. A method for using a compact scanner mounted in a drive bay of a computer to scan an original and generate a scanning signal, said method comprising the steps of:

extending a drawer from the scanner outward of the drive bay;

placing the original on the drawer in a position to be scanned;

moving the drawer into the scanner;

performing a calibration scan as the drawer is moved into the scanner;

sensing the closure of the drawer into the drive bay;

actuating a scanning mechanism, in response to the sensing step, to illuminate an image scan location within the scanner; and moving the drawer out of the scanner past the image scan location while scanning the original to generate the scanning signal.

* * * * *